US009989345B2

(12) United States Patent
Kikuchi

(10) Patent No.: US 9,989,345 B2
(45) Date of Patent: Jun. 5, 2018

(54) LINEAR DISPLACEMENT MEASURING APPARATUS

(71) Applicant: Mitutoyo Corporation, Kawasaki, Kanagawa (JP)

(72) Inventor: Kazushi Kikuchi, Utsunomiya (JP)

(73) Assignee: MITUTOYO CORPORATION, Kawasaki (JP)

( * ) Notice: Subject to any disclaimer, the term of this patent is extended or adjusted under 35 U.S.C. 154(b) by 106 days.

(21) Appl. No.: 15/278,675

(22) Filed: Sep. 28, 2016

(65) Prior Publication Data

US 2017/0089681 A1 Mar. 30, 2017

(30) Foreign Application Priority Data

Sep. 30, 2015 (JP) ................................ 2015-193963

(51) Int. Cl.
*G01D 5/347* (2006.01)
*G01B 3/08* (2006.01)
*G01B 3/00* (2006.01)
*G01D 5/244* (2006.01)

(52) U.S. Cl.
CPC ............... *G01B 3/08* (2013.01); *G01B 3/002* (2013.01); *G01D 5/24442* (2013.01); *G01D 5/34753* (2013.01)

(58) Field of Classification Search
CPC .................................................. G01D 5/34746
USPC .......................................... 33/706, 707, 708
See application file for complete search history.

(56) References Cited

U.S. PATENT DOCUMENTS 8,035,049 B2 * 10/2011 Kato ...................... G01D 5/145 200/329
2002/0029488 A1 * 3/2002 Nishi ................ G01D 5/34753 33/706
2007/0256313 A1 * 11/2007 McAdam ............ G01D 5/2451 33/706
2013/0227853 A1 * 9/2013 Schmoller ................ G01B 5/02 33/706
2014/0338446 A1 * 11/2014 Kodama ................ G01D 11/26 73/431

(Continued)

FOREIGN PATENT DOCUMENTS

EP 1462758 9/2004
JP 2004-301541 10/2004

*Primary Examiner* — G. Bradley Bennett
(74) *Attorney, Agent, or Firm* — Rankin, Hill & Clark LLP

(57) ABSTRACT

There is provided a linear displacement measuring apparatus which notifies a user when being installed defectively. A slider includes a traveling body which travels along a main scale on the main scale, a carriage part mounted on an object, and coupling means which couples the traveling body with the carriage part. The coupling means allows relative displacement between the traveling body and the carriage part and biases the traveling body towards the main scale. The coupling means has a connecting rod arranged so as to couple the traveling body with the carriage part via a ball joint. The slider further has misalignment detecting means which detects that the relative displacement between the traveling body and the carriage part exceeds a prescribed allowable range. The misalignment detecting means is a pair of projecting pieces arranged in a vicinity of the connecting rod so that the displacement of the connecting rod is regulated within a predetermined range.

7 Claims, 15 Drawing Sheets

(56) References Cited

U.S. PATENT DOCUMENTS

| | | | | |
|---|---|---|---|---|
| 2015/0330813 | A1* | 11/2015 | Schlichtner .......... | G01D 5/2457<br>33/707 |
| 2016/0209246 | A1* | 7/2016 | Kato .................. | G01D 5/24438 |
| 2016/0258786 | A1* | 9/2016 | Fritsch ............... | G01D 5/34746 |

* cited by examiner

COMPARISON EXAMPLE

LINEAR DISPLACEMENT MEASURING APPARATUS

INCORPORATION BY REFERENCE

This application is based upon and claims the benefit of priority from Japanese patent application No. 2015-193963, filed on Sep. 30, 2015, the disclosure of which are incorporated herein in its entirety by reference.

BACKGROUND OF THE INVENTION

1. Field of the Invention The present invention relates to a linear displacement measuring apparatus.

2. Description of Related Art

There have been used displacement measuring apparatuses, that is, what is called encoders in order for various industrial machines to accurately perform position control (for example, JP 2004-301541 A).

A linear displacement measuring apparatus 100 is illustrated in FIG. 1. The linear displacement measuring apparatus 100 includes an elongate scale part 200 and a slider 300 provided so as to be slidable relatively to the scale part 200.

The linear displacement measuring apparatus 100 is mounted to, for example, a moving stage 90. It is assumed that the moving stage 90 is constituted by a base 91 and a stage 92 which is slidable relatively to the base 91. At this time, the scale part 200 is screwed on the side end face of the stage 92, and the slider 300 is screwed on the base 91. With this structure, it is possible to accurately measure the relative displacement of the stage 92 with respect to the base 91.

FIG. 2 is a cross-sectional view taken along the line II-II of FIG. 1.

The scale part 200 includes an elongate main scale 210 (see FIG. 2) and a scale housing case 220 which houses the main scale 210. The main scale 210 is mainly constituted by a glass substrate, and the graduations of a scale are formed in the measurement axis direction. In an example of a photoelectric apparatus, the graduations are equivalent to a diffraction grating.

The scale housing case 220 is hollow and long, and is mainly made of (light) metal, such as aluminum. The scale housing case 220 has a slit 222 along the axial direction on the side face, and the inside and the outside are connected via the slit 222. The main scale 210 is mounted and fixed to the inside of the scale housing case 220. Then, a plurality of holes is drilled in the scale housing case 220 to be mounted and fixed, and the scale housing case 220 is screwed on the stage 92 with the holes.

The slider 300 is provided so as to relatively movable in the longitudinal direction of the scale housing case 220, and detects a relative displacement amount or a relative position with respect to the main scale 210. The slider 300 includes a traveling body 400, a carriage part 310, and coupling means 500. The traveling body 400 travels along the main scale 210 on the main scale 210. The carriage part 310 is provided outside the scale housing case 220 and slides along the scale part 200. The coupling means 500 couples the traveling body 400 with the carriage part 310.

The traveling body 400 includes a detection unit, and the detection unit detects a relative displacement amount with respect to the main scale 210. The coupling means 500 is a joint capable of absorbing angular variation to some extent, and allows the relative displacement between the traveling body 400 and the carriage part 310. (Here, a ball joint is exemplified.)

The moving stage 92 is straightly guided by a linear guide or the like, whereas the main scale 210 made of, for example, glass can have waviness. Unless the relative displacement between the traveling body 400 and the carriage part 310 is allowed to some extent, the traveling body 400 can bite the main scale 210, or the traveling body 400 can float from the main scale 210. Thus, the traveling body 400 and the carriage part 310 are coupled by a joint having a certain degree of freedom. Furthermore, the traveling body 400 is pressed to the main scale 210 by a spring (wire spring) so as to keep a state of facing the main scale 210.

With this structure, when the stage 92 slides, the scale part 200 and the carriage part 310 are relatively displaced accordingly. Since the carriage part 310 and the traveling body 400 are coupled by the coupling means 500, the traveling body 400 as well as the carriage part 310 relatively move with respect to the main scale 210. At this time, the detection unit detects the relative displacement amount with respect to the main scale 210, and outputs the detection to the outside.

SUMMARY OF THE INVENTION

A linear displacement measuring apparatus 100 should be mounted on an object (for example, a moving stage 90, a machine tool, or the like) within a prescribed installation tolerance. However, the linear displacement measuring apparatus 100 can actually be mounted by a user in non-parallel beyond the prescribed installation tolerance or in a state of being strained. If the linear displacement measuring apparatus 100 is mounted beyond the prescribed installation tolerance, the function of a joint (coupling means 500) absorbs the strain or the non-parallelism, and the traveling body 400 is able to travel on the main scale 210. Then, the measurement value is obtained. However, when the object (for example, the moving stage 90, the machine tool, or the like) is controlled based on the measurement value, the results cannot be correctly obtained. Alternatively, if the linear displacement measuring apparatus 100 is mounted beyond the prescribed installation tolerance, the components constituting the linear displacement measuring apparatus 100 rub or bump together, and which can cause a breakdown. However, the user can cause defectives due to machining errors or a breakdown without noticing this problem.

A purpose of the present invention is to provide a linear displacement measuring apparatus which notifies a user when being installed defectively.

A linear displacement measuring apparatus in an aspect of the present invention includes:

an elongate main scale mounted on one of two objects which linearly relatively move; and a slider mounted on the other of the two objects and configured to slide along the main scale and detect a relative displacement amount with respect to the main scale, in which the slider comprises;

a traveling body configured to travel on the main scale along the main scale;

a carriage part mounted on the other of the two objects;

coupling means for coupling the traveling body with the carriage part, the coupling means allowing relative displacement between the traveling body and the carriage part and biasing the traveling body toward the main scale, and misalignment detecting means for detecting that the relative displacement between the traveling body and the carriage part exceeds a prescribed allowable range.

In an aspect of the present invention, it is preferable that the misalignment detecting means is a pair of projecting pieces arranged in a vicinity of the connecting rod so that displacement of the connecting rod is regulated within a predetermined range.

In an aspect of the present invention, it is preferable that the pair of projecting pieces is disposed on a frame of the traveling body so as to face with each other with a predetermined distance to receive the connecting rod therebetween.

In an aspect of the present invention, it is preferable that the misalignment detecting means is a pressing plate fixedly arranged at an opposite side to a frame of the traveling body while interposing the connecting rod.

In an aspect of the present invention, it is preferable that the misalignment detecting means includes;

a hole provided on the traveling body and one side of the carriage part; and a pin provided on the traveling body and the other side of the carriage part, in which a head part of the pin is freely fitted in the hole.

In an aspect of the present invention, it is preferable that the coupling means has a connecting rod arranged so as to couple the traveling body with the carriage part via a ball joint, and the misalignment detecting means is a sensor configured to detect displacement exceeding a predetermined range of the connecting rod.

In an aspect of the present invention, it is preferable that the coupling means includes:

a connecting rod arranged so as to couple the traveling body with the carriage part via a ball joint; and an elastic member configured to bias the connecting rod toward the main scale, and the misalignment detecting means is a strain gauge fixed on the connecting rod or the elastic member.

DETAILED DESCRIPTION

Figure 1:
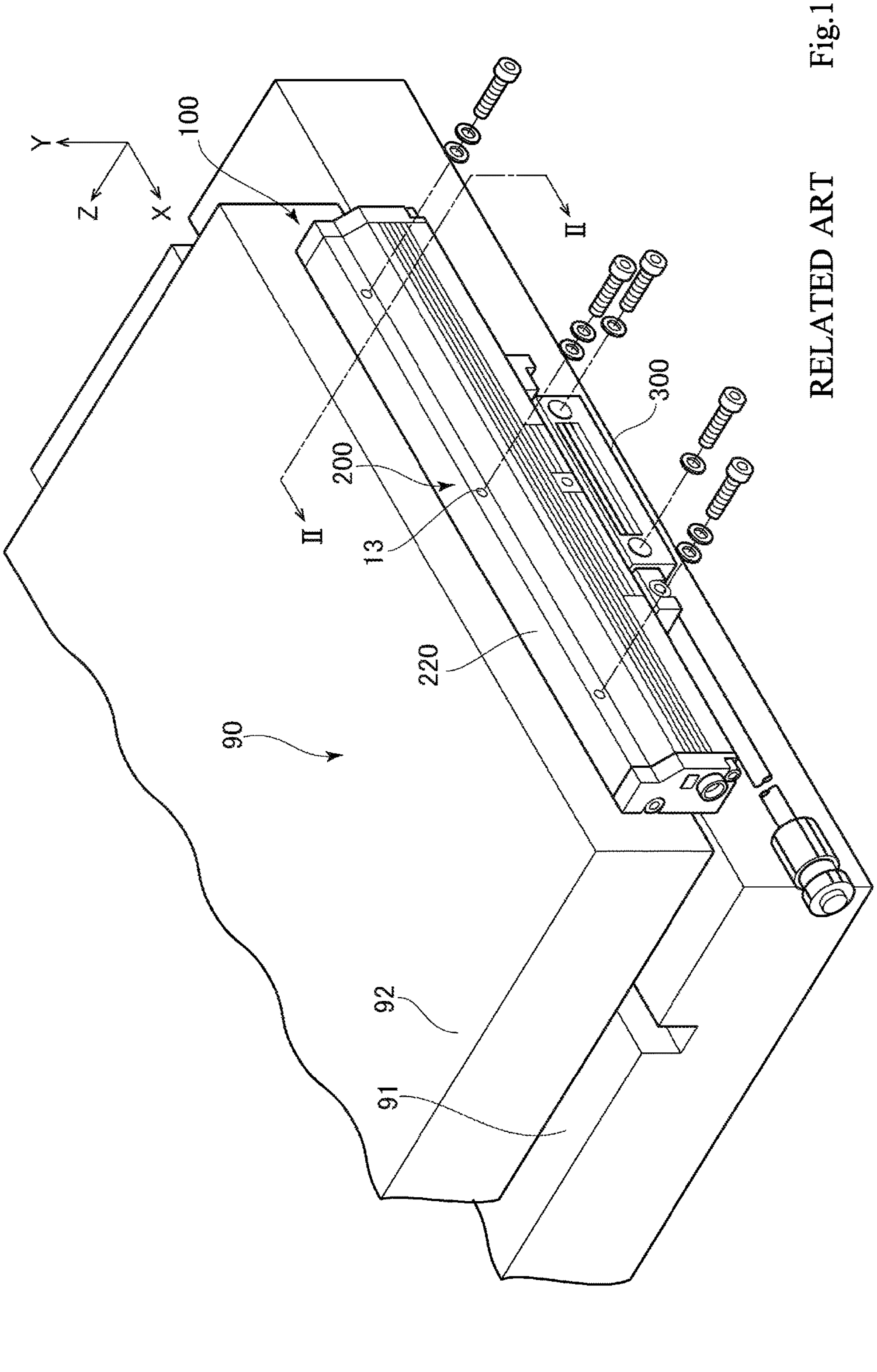
FIG. 1 is a perspective view of a linear displacement measuring apparatus.
Figure 2:
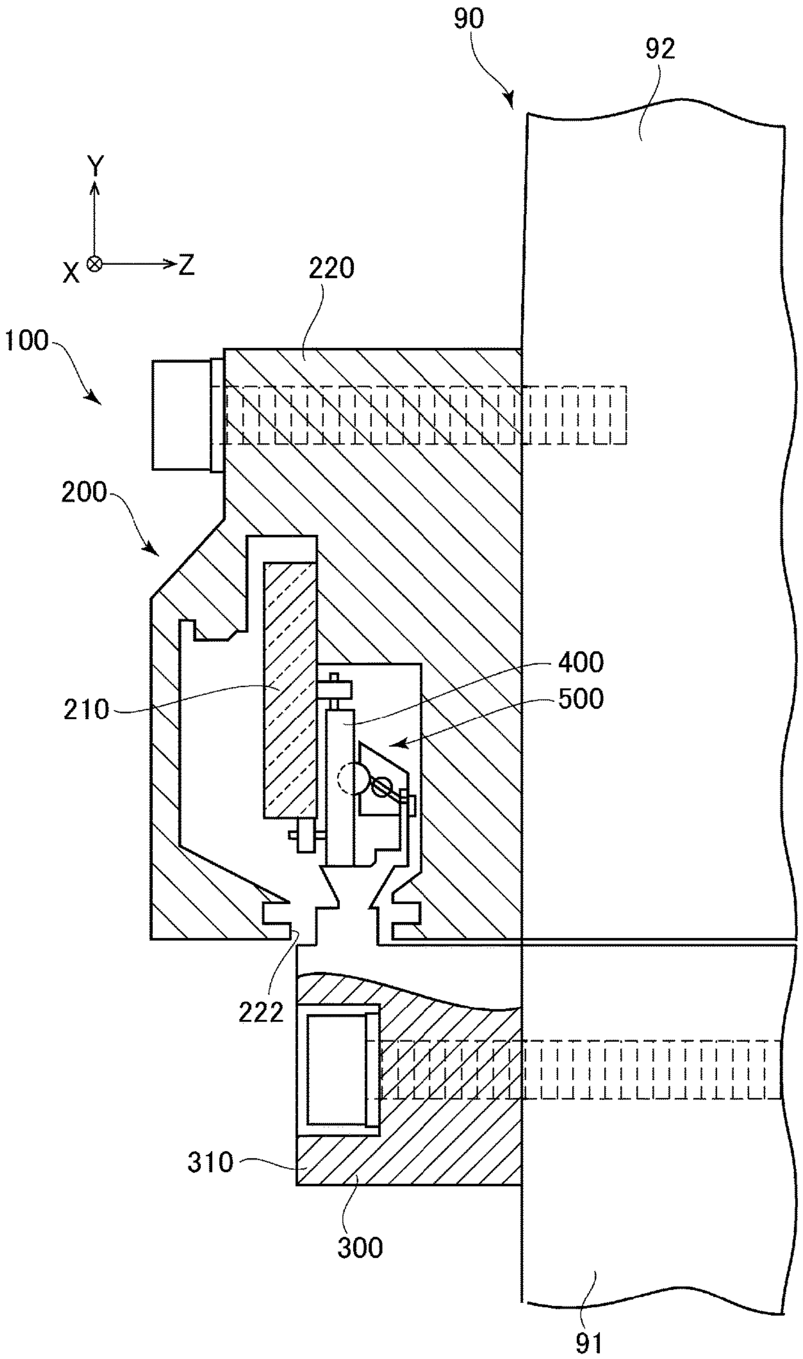
FIG. 2 is a cross-sectional view taken along the line II-II of FIG. 1.

Embodiments of the present invention are illustrated and described with reference to the reference signs attached to the elements in the drawings.

First Exemplary Embodiment

A feature of the present exemplary embodiment is mainly a structure of a slider 300, and the description of a scale part 200 is omitted since the scale part 200 is similar to the related art.

Figure 3:
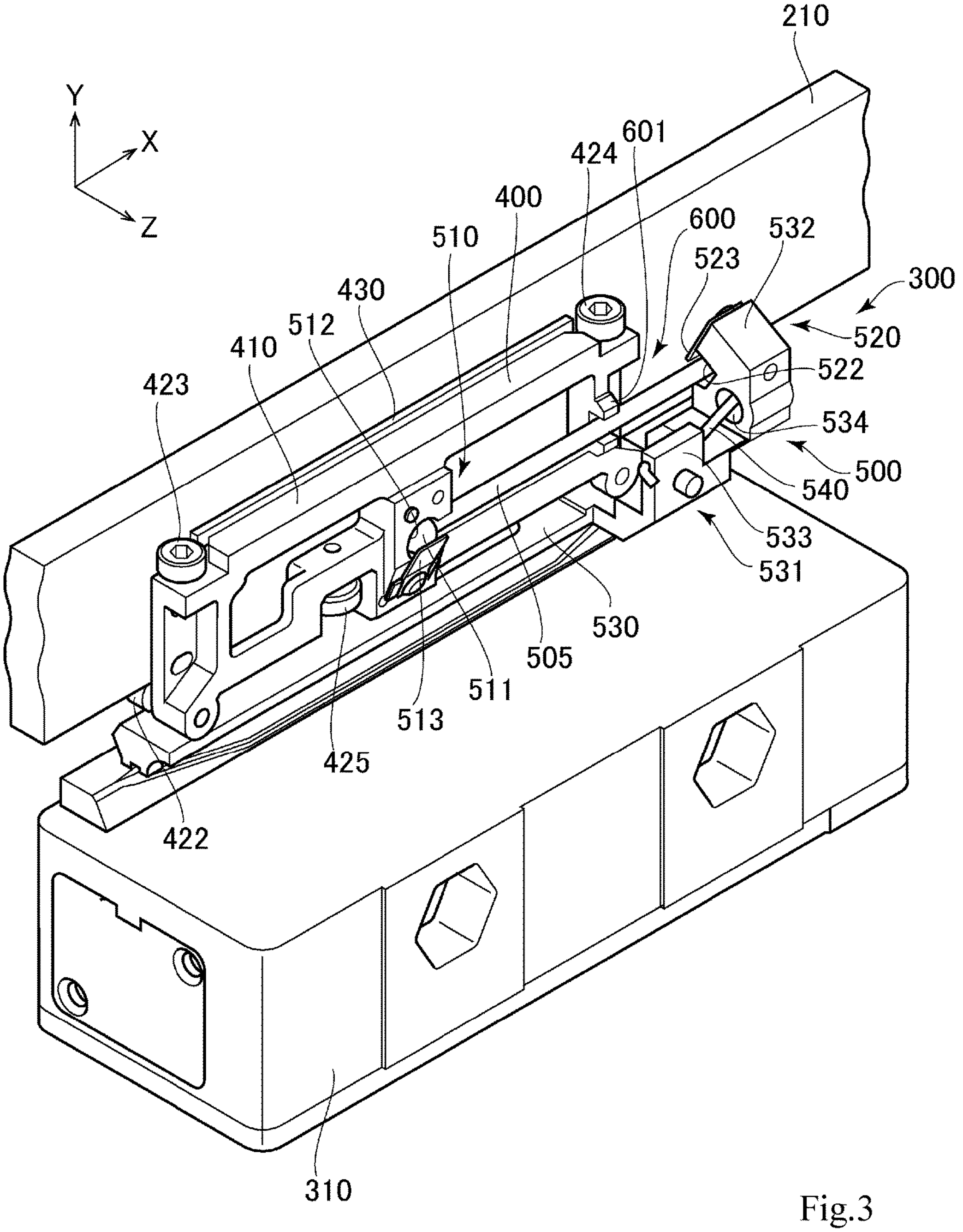
FIG. 3 is a perspective view of a slider.
Figure 4:
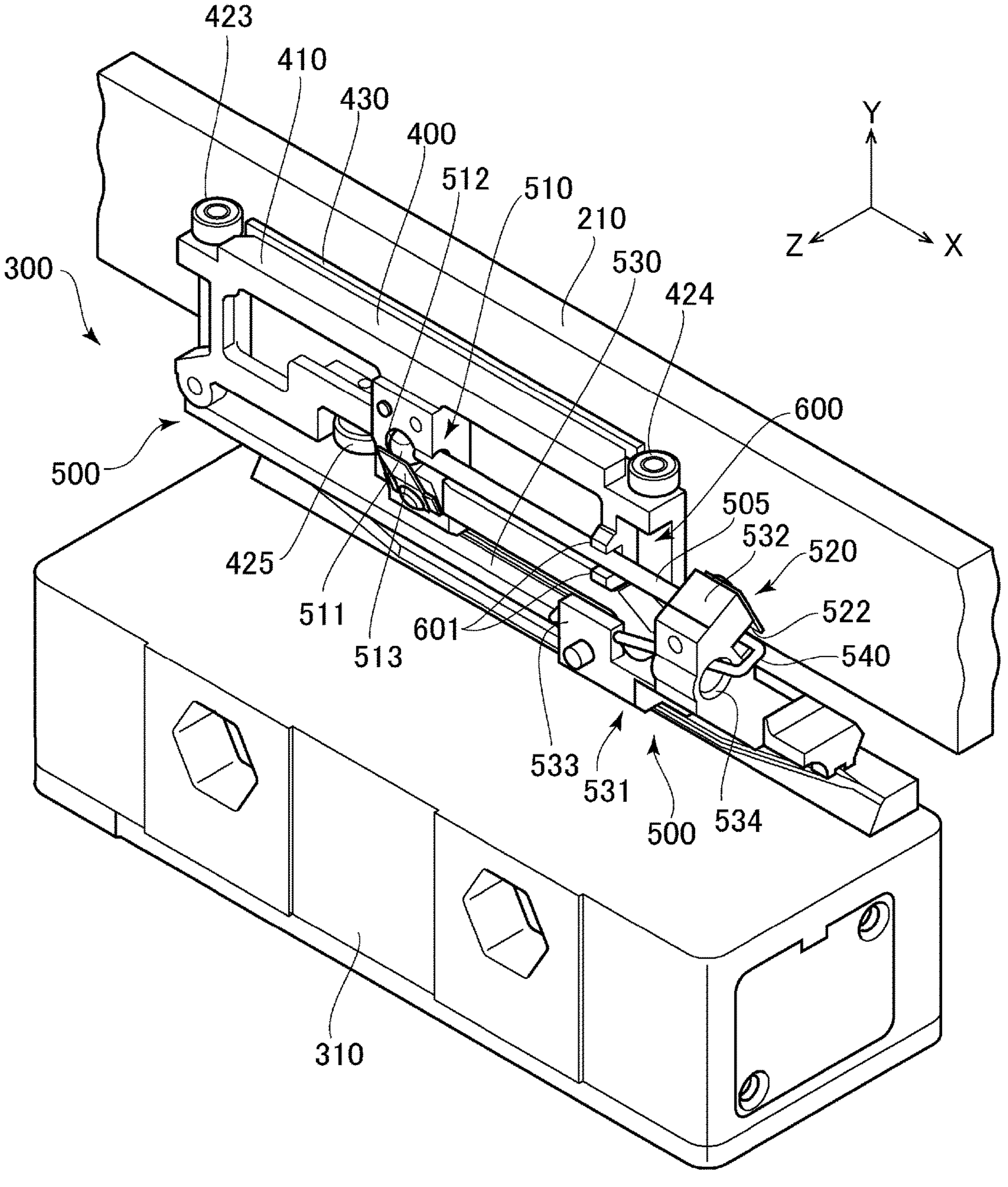
FIG. 4 is a perspective view of the slider.

FIGS. 3 and 4 are perspective views of the slider 300.

Figure 5:
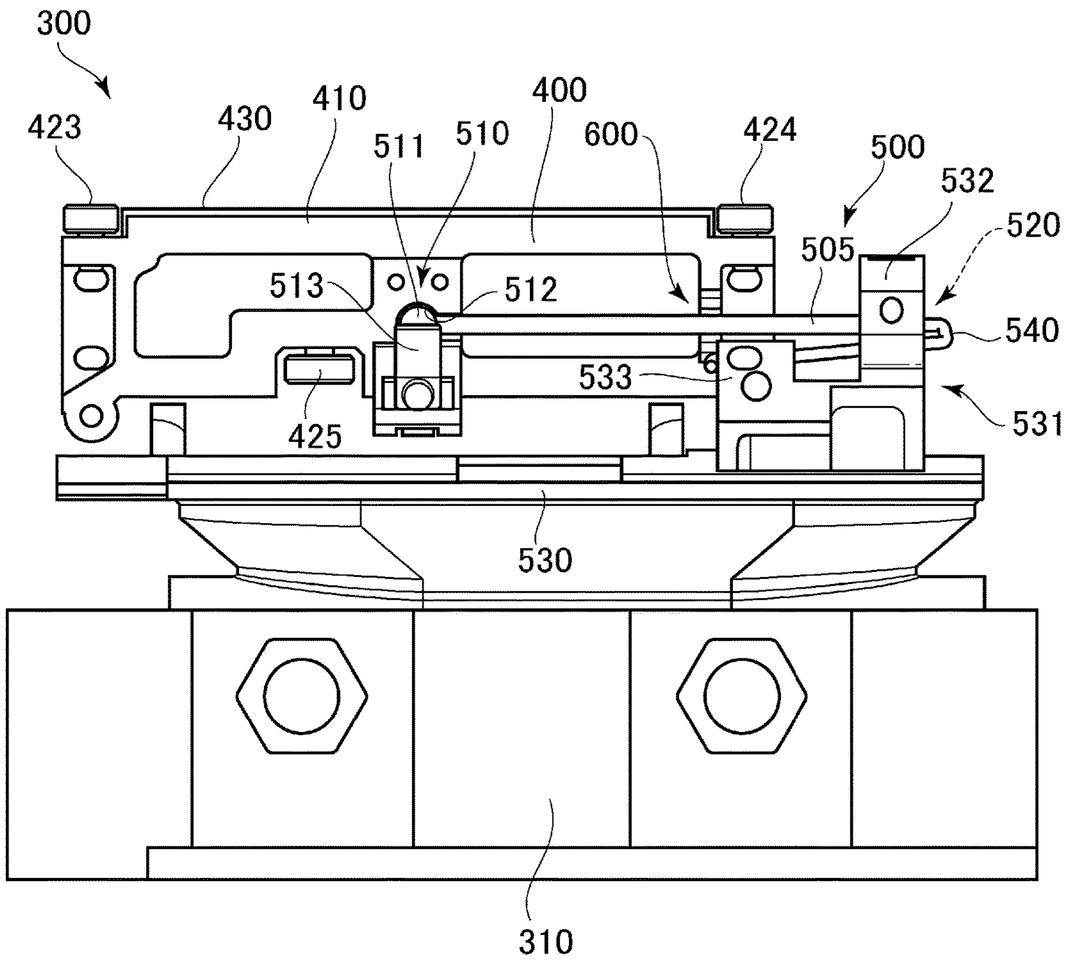
FIG. 5 is a rear face side view of the slider.

FIG. 5 is a rear face side view of the slider 300.

The slider 300 includes a traveling body 400, a carriage part 310, coupling means 500, and misalignment detecting means 600. The traveling body 400 travels along a main scale 210 on the main scale 210. The carriage part 310 is provided outside a scale housing case 220 and slides along the scale part 200. The coupling means 500 couples the traveling body 400 with the carriage part 310. The misalignment detecting means 600 detects an installation shift which exceeds a prescribed amount.

Figure 6:
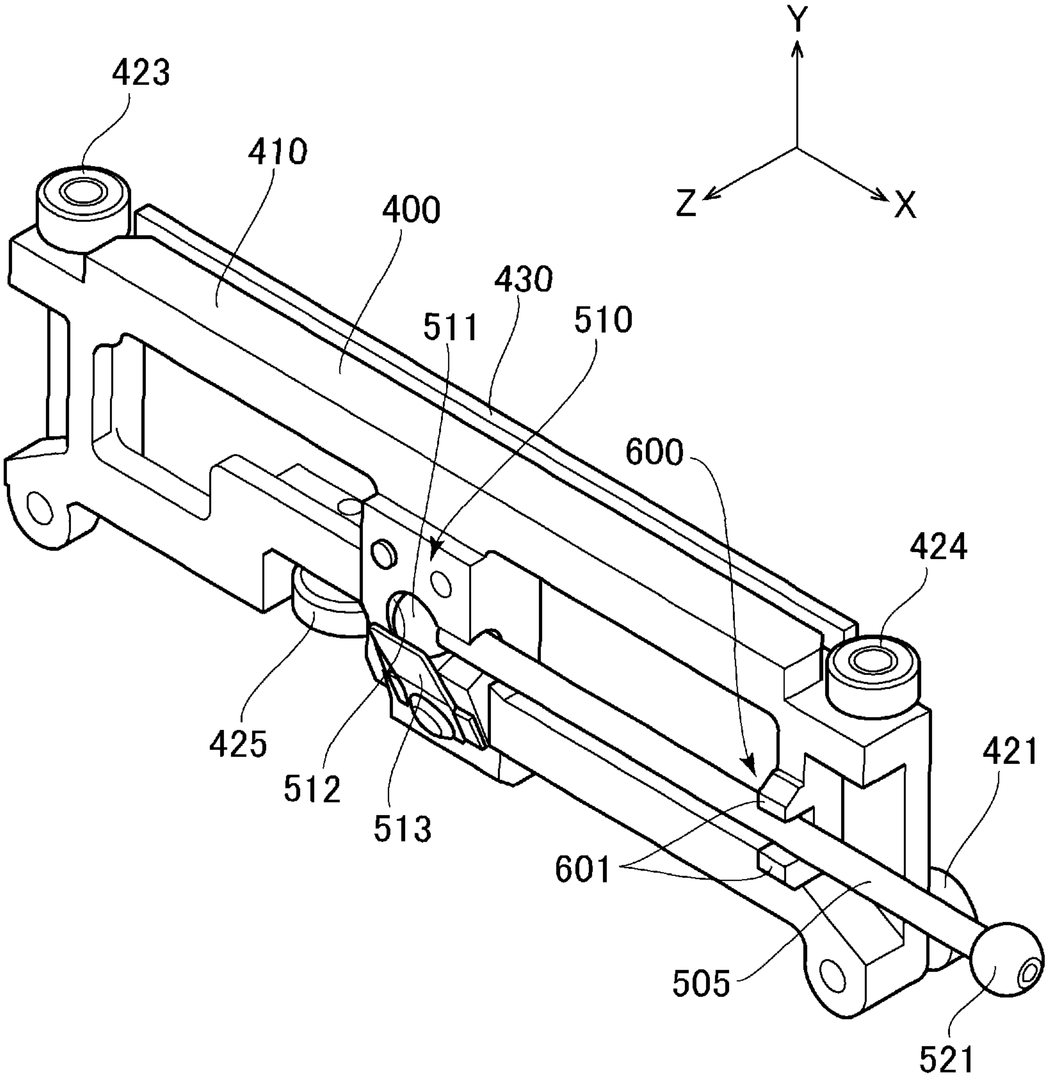
FIG. 6 is a perspective view of a traveling body.

FIG. 6 is a perspective view of a part of the traveling body 400 and the coupling means 500 after the carriage part 310 is removed from the slider 300.

The traveling body 400 includes a base frame part 410, a plurality of rollers 421 to 425, and a detection unit 430 mounted on the base frame part 410.

The base frame part 410 is a rectangular frame body as a whole.

The side face, which faces the main scale 210, of the base frame part 410 is a front face of the base frame part 410.

The rollers are pivotally supported by the base frame part 410. In this description, five rollers are provided. Here, it is assumed that the side face, which faces the traveling body 400, of the main scale 210 is the front face of the main scale 210. Three rollers of the five rollers contact with the front face of the main scale 210, and the other two rollers contact with the side face of the main scale 210. The rollers contacting with the side face of the main scale 210 are referred to as side rollers 421 and 422, and the rollers contacting with the front face of the main scale 210 are referred to as front rollers 423, 424, and 425.

Here, to intelligibly explain directions, coordinate axes are set. In FIG. 3, it is assumed that the measurement axis of the main scale 210 is an X-axis, the width direction of the main scale 210 is a Y-axis, and the direction from the rear face of the main scale 210 to the front face is a Z-axis. Furthermore, in FIG. 3, the upside, the downside, the front, and the back are defined. It is assumed that the positive direction of the Y-axis is the upside, the negative direction of the Y-axis is the downside, the positive direction is the X-axis is the front, and the negative direction of the X-axis is the back.

The side face of the main scale 210 (the side face, which faces downward, of the scale in FIGS. 3 and 4) is a reference plane and is finished to be a straight and flat surface. The side rollers 421 and 422 contact with the lower side face of the main scale 210. The two side rollers 421 and 422 are respectively arranged on the front part and the rear part of the lower side of the base frame part 410, and the rotation axes are parallel to the Z-axis. The side rollers 421 and 422 moves by rolling while contacting with the lower side face of the main scale 210, and thereby the traveling body 400 straightly moves by being guided by the main scale 210.

The three front rollers 423, 424, and 425 are respectively arranged on the front part and the rear part of the upper side of the base frame part 410, and on the substantially center of the lower side, and the rotation axes are parallel to the Y-axis.

The three front rollers 423, 424, and 425 move by rolling while contacting with the front face of the main scale 210, and thereby the traveling body 400 moves while keeping a state of facing the main scale 210.

The detection unit 430 is mounted on the front face of the base frame part 410, and the detection unit 430 is disposed so as to face the main scale 210. The detection unit 430 reads the graduations of the main scale 210, and detects the relative displacement amount or the relative position with respect to the main scale 210. If the apparatus is a photoelectric apparatus, the detection unit 430 includes a light source, an index scale, a light receiving element array. In some cases, the detection unit 430 may include an IC chip.

The traveling body 400 travels while keeping the state of facing the main scale 210, and the detection unit 430 also moves while keeping the state of facing the main scale 210 accordingly. To be more specific, when the side rollers 421 and 422 are contacting with the lower side face of the main scale 210, and when the front rollers 423, 424, and 425 are contacting with the front face of the main scale 210, the main scale 210 and the traveling body 400 are designed so that the detection unit 430 faces the graduations of the main scale 210.

The carriage part 310 is provided outside the scale housing case 220, and is mounted and fixed on an object (for example, the base 91).

Here, the carriage part 310 is screwed on the base 91.

The coupling means 500 presses the traveling body 400 to the main scale 210 while coupling the traveling body 400 with the carriage part 310.

The coupling means 500 includes a connecting rod 505, two ball joints 510 and 520, a neck part 530, and a wire spring (elastic member, biasing means) 540.

The connecting rod 505 is arranged on the rear face side of the base frame part 410 in parallel to the X-axis. The first ball joint 510 is provided in the substantially center of the base frame part 410 in the longitudinal direction, and the base end of the connecting rod 505 is connected with the substantially center of the rear face of the base frame part 410 by the first ball joint 510. In this description, a ball receiving recessed part 512 which receives a ball 511 is provided in the substantially center of the rear face of the base frame part 410. The ball 511 provided at the base end of the connecting rod 505 is fit in the ball receiving recessed part 512. Note that, in order for the ball 511 not to be easily detached from the ball receiving recessed part 512, the ball 511 is pressed to the ball receiving recessed part 512 with a pressing plate 513.

The tip of the connecting rod 505 projects so as to be longer than the front side end of the base frame part 410, and is coupled to the second ball joint 520.

The second ball joint 520 will be described later.

The neck part 530 is provided integrally with the carriage part 310, and disposed inside the scale housing case 220 via the slit 222 of the scale housing case 220. The neck part 530 has a couple head part 531 rising in the vicinity of the front part of the base frame part 410 on the rear face side of the base frame part 410. The couple head part 531 has a connection piece 532 to be connected with the tip of the connecting rod 505 and a latch piece 533 to generate a pressing force on the connecting rod 505. The connection piece 532 is provided in front of the base frame part 410, and coupled to the tip of the connecting rod 505 by the second ball joint 520. In this description, there are provided a ball 521 at the tip of the connecting rod 505 and a ball receiving recessed part 522 at the connection piece 532, and the ball 521 is fitted in the ball receiving recessed part 522. In order for the ball 521 not to be easily detached from the ball receiving recessed part 522, the ball 521 is pressed to the ball receiving recessed part 522 with a pressing plate 523. Furthermore, there is further provided an insertion hole 534 parallel to the X-axis in the connection piece 532. The effects of the insertion hole 534 and the latch piece 533 are described below.

The wire spring (biasing means) 540 is interposed between the tip of the connecting rod 505 and the latch piece 533. The based end of the wire spring (biasing means) 540 is mounted at the tip of the connecting rod 505, and the tip of the wire spring 540 is engaged with the latch piece 533. More specifically, the wire spring 540 is engaged with the latch piece 533 via the insertion hole 534 by being folded backward from the tip of the connecting rod 505.

Note that, as illustrated in FIGS. 3 to 5, the wire spring 540 is not parallel to the connecting rod 505, but is slightly lowered obliquely downward toward the tip from the base end. When the wire spring 540 exerts the biasing force between the latch piece 533 and the tip of the connecting rod 505, the base end of the connecting rod 505 is biased toward the main scale 210 with the tip of the connecting rod 505 as a fulcrum. The traveling body 400 is thereby biased toward the main scale 210 accordingly. More specifically, since the tip of the wire spring 540 is slightly lowered downward compared to the base end, the traveling body 400 is biased obliquely upward. Thus, the side rollers 421 and 422 of the traveling body 400 are pressed to the lower side face of the main scale 210, and the front rollers 423, 424, and 425 are simultaneously pressed to the front face of the main scale 210. The traveling body 400 thereby keeps the state of facing the main scale 210, and travels along the main scale 210 by being guided by the reference plane of the main scale 210.

The misalignment detecting means 600 consists of two projecting pieces 601 which project from the front part of the rear face of the base frame part 410. The two projecting pieces 601 are a pair of projecting pieces facing each other with a predetermined distance, and receive the connecting rod 505 therebetween. The two projecting pieces 601 are provided on a beam which is positioned near the X plus direction on the rear face of the base frame part 410 and parallel to the Y-axis. The two projecting pieces 601 are separated from each other in the Y direction. The distance between the two projecting pieces 601 is slightly larger than the diameter of the connecting rod 505. The gap between each projecting piece 601 and the connecting rod 505 is, for example, about 0.1 mm to 0.3 mm.

(Movements)

The movements of the first exemplary embodiment having the above structure are described below.

As illustrated in FIG. 1, the scale part 200 is mounted on the stage 92, and the carriage part 310 is mounted on the base 91. Then, when the stage 92 slides, the scale part 200 and the carriage part 310 are relatively displaced accordingly. Since the carriage part 310 is coupled to the traveling body 400 by the coupling means 500, the traveling body 400 as well as the carriage part 310 move relatively to the main scale 210. At this time, the detection head part detects the relative displacement amount with respect to the main scale 210, and outputs the amount to the outside.

Figure 7:
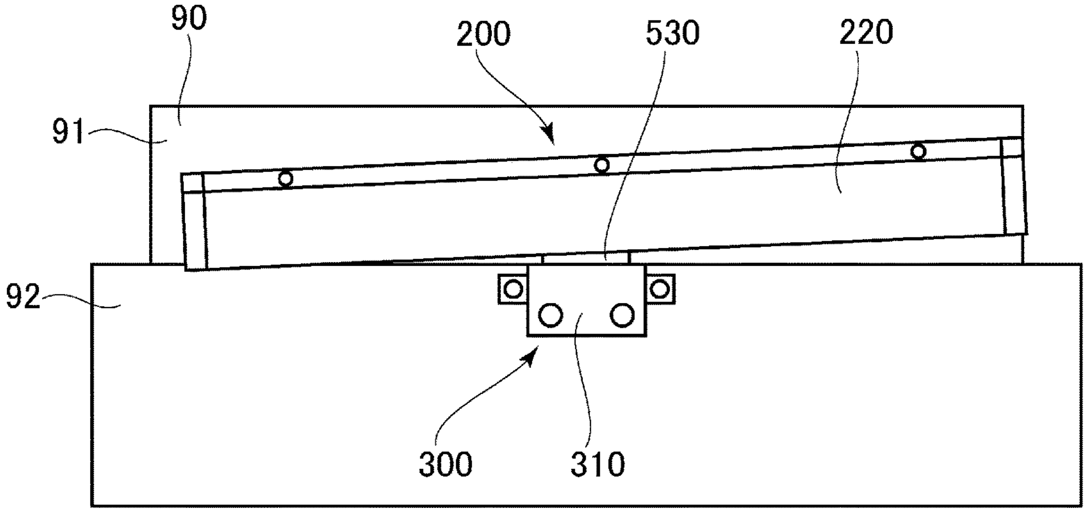
FIG. 7 is a diagram illustrating that a scale is slightly inclined to a stage and mounted.

To intelligibly explain the function of the misalignment detecting means 600 (the projecting pieces 601 and 601)

which is the feature of the present exemplary embodiment, the case illustrated in FIG. 7 is descried. In FIG. 7, a scale 200 is slightly inclined to the stage 92 and mounted.

Note that, FIG. 7 illustrates that the scale 200 is excessively inclined to be easily understood, but the actual installation tolerance is equal to or less than 0.1 mm, and measurement errors or component breakage can be caused if the tolerance exceeds 0.1 mm.

Figure 8:
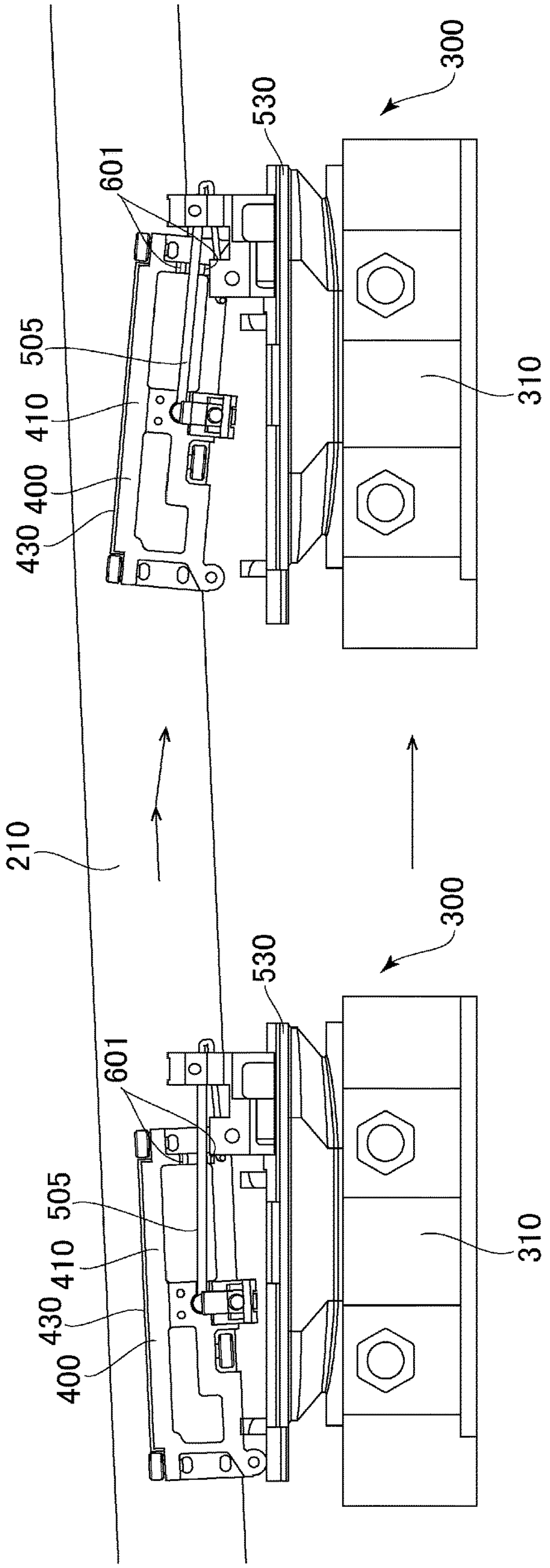
FIG. 8 is a diagram schematically illustrating relation between a slider and a main scale.

The case in which the stage 92 slides to the right and the left with respect to the base 91 is described. FIG. 8 is a diagram schematically illustrating the relation between the slider 300 and the main scale 210 when the stage 92 slides to the left. Note that, to be easily understood, FIG. 8 illustrates that the slider 300 relatively moves to the right when it is assumed that the stage 92 is stopped.

Since the shifted main scale 210 is mounted, when the carriage part 310 relatively moves to the right with respect to the main scale 210, the main scale 210 is gradually separated from the carriage part 310. When the shifted main scale 210 is mounted, the traveling body 400 is to move along the main scale 210 while keeping the state of closely contacting with the main scale 210 by the biasing force especially of the wire spring 540 of the coupling means 500. However, as the main scale 210 is gradually separated from the carriage part 310, the connecting rod 505 connecting the traveling body 400 with the carriage part 310 is gradually inclined to the traveling body 400. Then, when the gap between the projecting piece 601 and the connecting rod 505 exceeds the allowable range by the inclination of the connecting rod 505, the connecting rod 505 is caught by the projecting piece 601.

When the connecting rod 505 contacts with the projecting piece 601, the connecting rod 505 cannot be further inclined to the traveling body 400. (In other words, the traveling body 400 cannot be further inclined to the connecting rod 505.) If the connecting rod 505 is further inclined, the traveling body 400 is pulled by the connecting rod 505 due to the engagement of the projecting piece 601 with the connecting rod 505, and separated from the main scale 210. When the traveling body 400 is separated from the main scale 210 in this manner, the detection unit 430 cannot sufficiently detect the scale signal. Unless the sufficient signal strength is obtained, a detection error is caused. Then, for example, the error is displayed on a display, and the movements of the machine (the moving stage 90 or the machine tool) are stopped. The user can notice some error at this time.

Note that, FIG. 8 excessively illustrates the case, a signal strength error is caused when the traveling body 400 is slightly shifted from the main scale 210 (for example, about 0.5 mm) although the traveling body 400 is not completely shifted as illustrated in FIG. 8.

Figure 9:
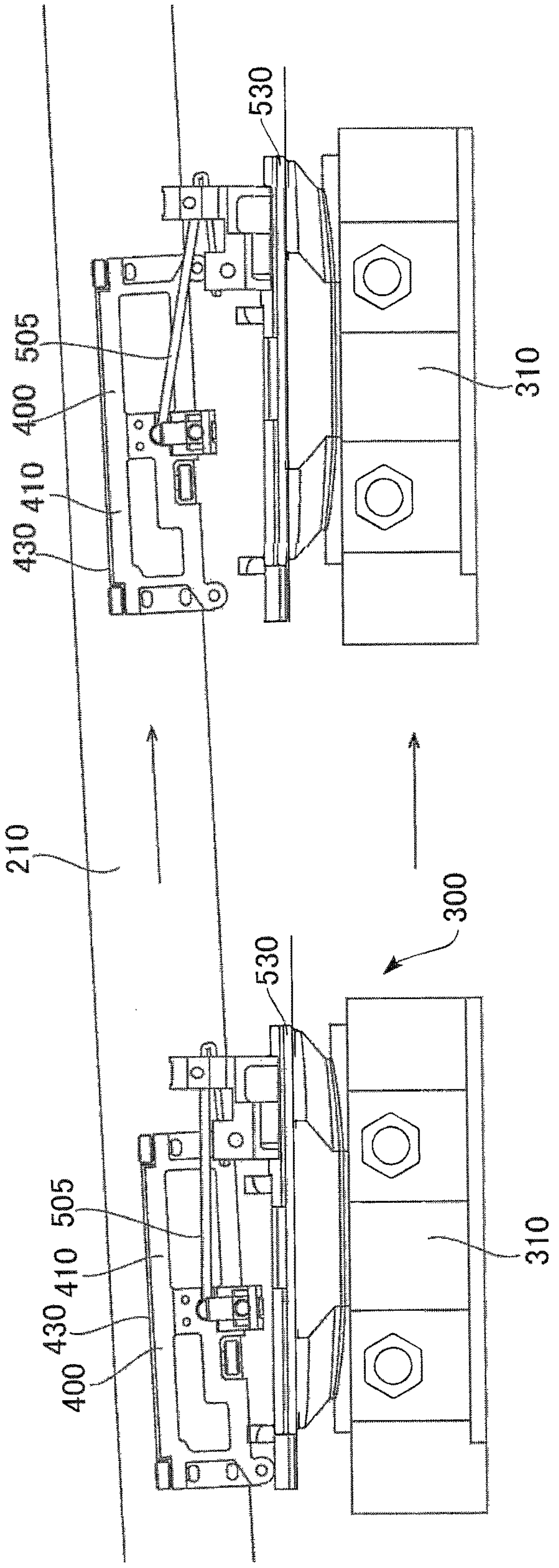
FIG. 9 is a diagram illustrating that a conventional traveling body follows a scale.

To further intelligibly explain the function of the projecting piece 601, FIG. 9 illustrates that a conventional traveling body 400 is following a scale as a comparison example. As illustrated in FIG. 9, when the projecting piece 601 is not provided, the ball joint of the coupling means 500 absorbs the inclination or the separation between the traveling body 400 and the carriage part 310, and the traveling body 400 unlimitedly follows the main scale 210 if the main scale 210 is inclined. Then, some detection signal is obtained, and the user cannot notice the misalignment of the main scale 210.

In the above described present exemplary embodiment, the projecting piece 601 as the misalignment detecting means 600 projects from the base frame part 410. With this structure, when the traveling body 400 is inclined too much to or separated too much from the carriage part 310, the connecting rod 505 is caught by the projecting piece 601, and the traveling body 400 is pulled by the connecting rod 505 and detached from the main scale 210. Thus, the traveling body 400 cannot follow the misaligned main scale 210, and a signal strength error is generated for the misaligned main scale 210. The measurement is suspended due to the signal strength error, and the user thereby notices the misalignment. Thus, the measurement is not erroneously performed while being misaligned. Furthermore, it is possible to prevent breakage of the encoder (the linear displacement measuring apparatus 100) by avoiding the components from rubbing or bumping together.

Second Exemplary Embodiment

Next, a second exemplary embodiment of the present invention is described below.

Figure 11:
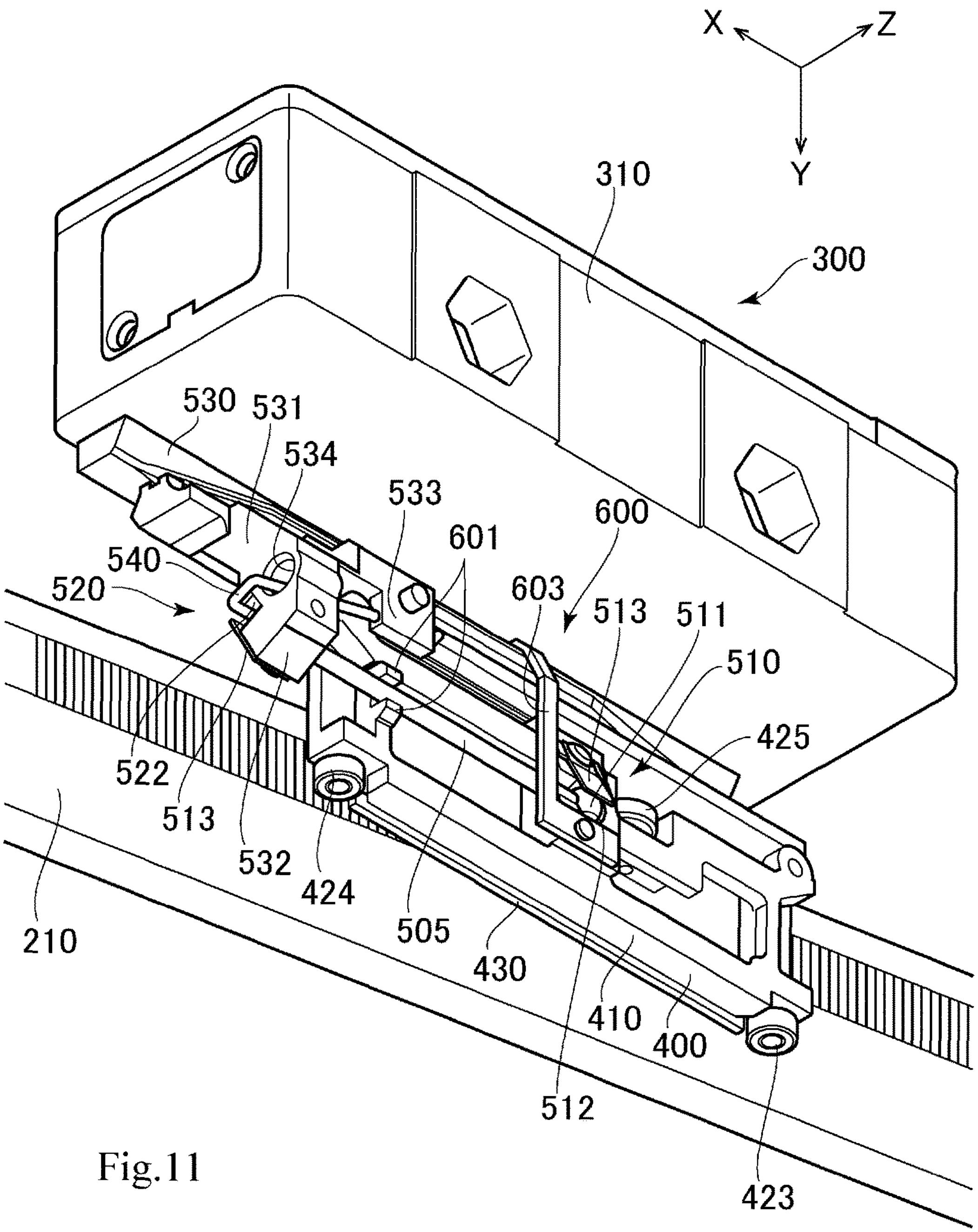
FIG. 11 is a diagram illustrating the second exemplary embodiment.

The basic structure of the second exemplary embodiment is similar to that of the first exemplary embodiment, but a feature of the second exemplary embodiment is to add a pressing plate 603 as misalignment detecting means 600 (see FIG. 11). In the above described first exemplary embodiment, the connecting rod 505 is received between the two projecting pieces 601 separated from each other in the Y-axis direction. Thus, when the main scale 210 is inclined in the Y-axis direction, the inclination is able to be detected. However, when the main scale 210 is shifted in, for example, the Z-axis direction, the shift cannot be detected in the first exemplary embodiment.

Figure 10:
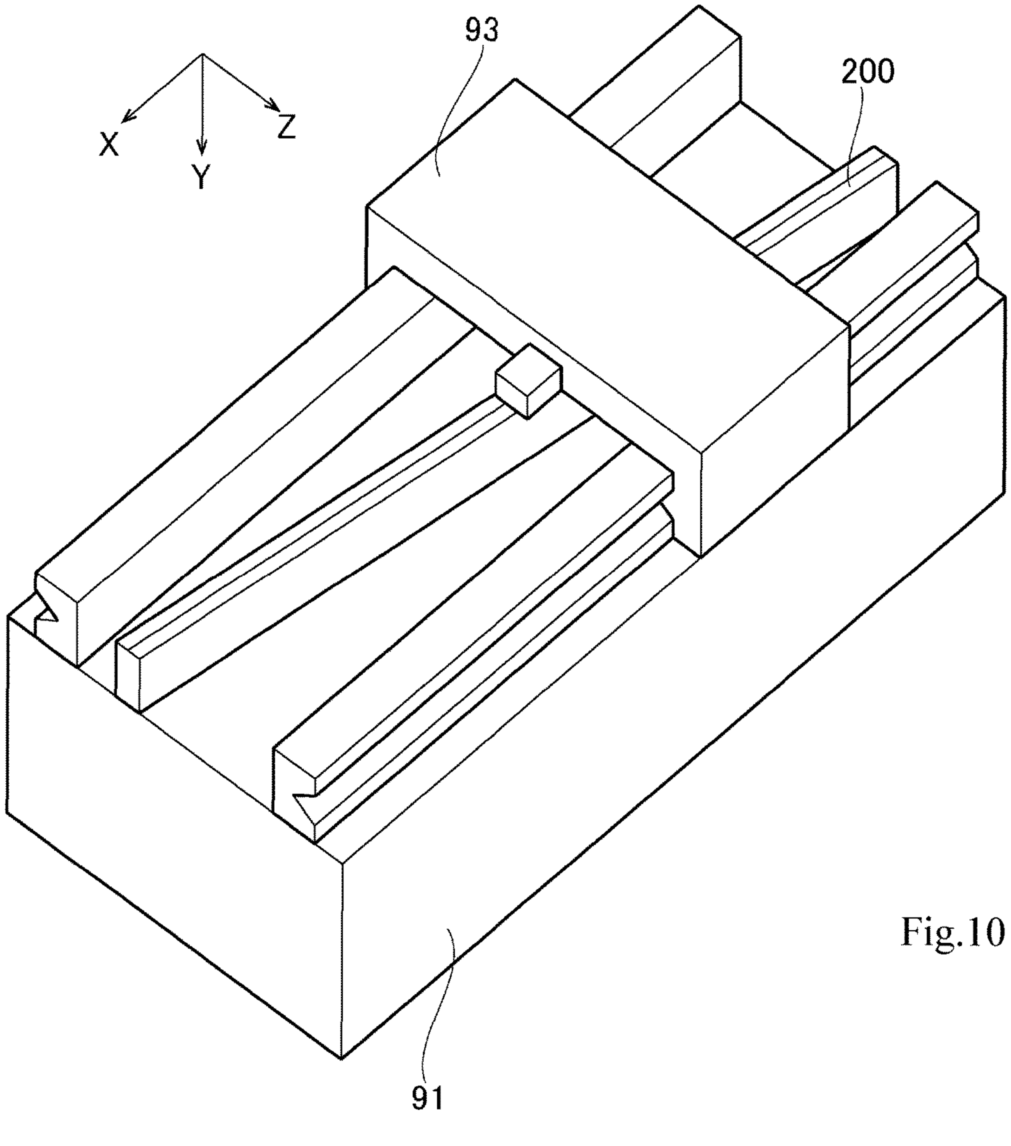
FIG. 10 is a diagram illustrating a second exemplary embodiment.

For example, in FIG. 10, an encoder (a linear displacement measuring apparatus 100) detects the position of a gate type slider 93 which moves forward and backward in the X-axis direction.

At this time, although a scale part 200 should be mounted in parallel to the moving direction of the gate type slider 93, the scale part 200 can be shifted from the direction parallel to the X-axis and mounted as illustrated in FIG. 10.

To detect such shifts, the misalignment detecting means 600 has, as illustrated in FIG. 11, a pressing plate 603 disposed at the rear face side of a base frame part 410 so as to straddle over a connecting rod 505. The tip of the pressing plate 603 is fixed to the rear face of the base frame part 410. More specifically, the tip of the pressing plate 603 is fixed at the opposite side to a neck part 530 on the rear face of the base frame part 410 while interposing a first ball joint 510. Furthermore, the pressing plate 603 straddles over the connecting rod 505, and the base end of the pressing plate 603 is fixed to the neck part 530. At this time, a slight gap is secured between the pressing plate 603 and the connecting rod 505, and which allows the relative displacement of a traveling body 400 with respect to a carriage part 310 in the Z direction to some extent.

Since the main scale 210 is sifted (in the Z-axis direction) and mounted, for example, when the carriage part 310 moves relatively to the main scale 210, the main scale 210 is gradually separated from the carriage part 310 (in the Z-axis direction). If the main scale 210 is shifted and mounted, the traveling body 400 is to move along the main scale 210 while keeping the state of closely contacting with the main scale 210 by the biasing force especially of the wire spring 540 of the coupling means 500. However, when the main scale 210 is gradually separated from the carriage part 310, the connecting rod 505 connecting the traveling body 400 with the carriage part 310 is gradually inclined to the traveling body 400 (in the Z-axis direction). Then, when the gap between the pressing plate 603 and the connecting rod 505 exceeds the allowable range by the inclination of the connecting rod 505 (in the Z-axis direction), the connecting rod 505 is caught by the pressing plate 603.

When the connecting rod 505 contacts with the pressing plate 603, the connecting rod 505 cannot be further inclined to the traveling body 400 (in the Z-axis direction). (The traveling body 400 cannot be further inclined to the connecting rod 505 (in the Z-axis direction).) If the connecting rod 505 is further inclined (in the Z-axis direction), the traveling body 400 is pulled by the connecting rod 505 due to the engagement of the pressing plate 603 with the connecting rod 505, and separated from the main scale 210 (see FIG. 11). When the traveling body 400 is separated from the main scale 210 in this manner, the detection unit 430 cannot sufficiently detect the scale signal. Unless the sufficient signal strength is obtained, a detection error is caused. Then, for example, the error is displayed on a display, and the movements of the machine (a moving stage 90 or a machine tool) are stopped. The user can notice some error at this time.

According to the second exemplary embodiment, although the main scale 210 is misaligned by being shifted in the Z-axis direction, the measurement is suspended due to the signal strength error, and the user can notice the misalignment.

Furthermore, it is possible not to continue the measurement while the scale is misaligned.

Third Exemplary Embodiment

Figure 12:
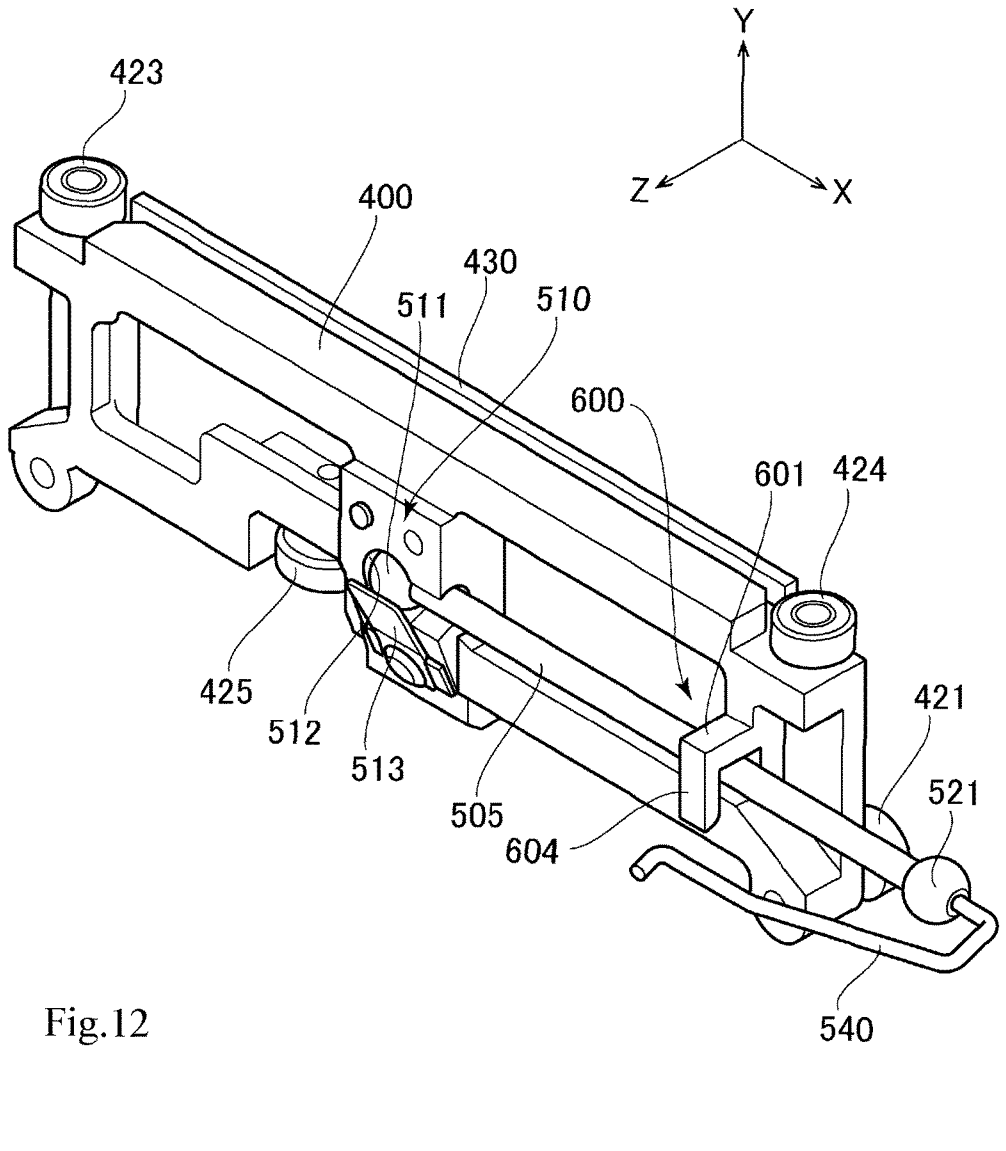
FIG. 12 is a diagram illustrating a third exemplary embodiment.

In a second exemplary embodiment, the pressing plate 603 is fixed on the base frame part 410. As means for regulating relative displacement between a connecting rod 505 and a traveling body 400 in the Z direction, for example, a pressing plate 604 may be provided at the tip of a projecting piece 601 as illustrated in FIG. 12. The pressing plate 604 is provided so as to be bent from the tip of the projecting piece 601 to have an L shape overhanging the connecting rod 505. With the pressing plate 604, an effect similar to the second exemplary embodiment is obtained.

Fourth Exemplary Embodiment and Fifth Exemplary Embodiment

Figure 13:
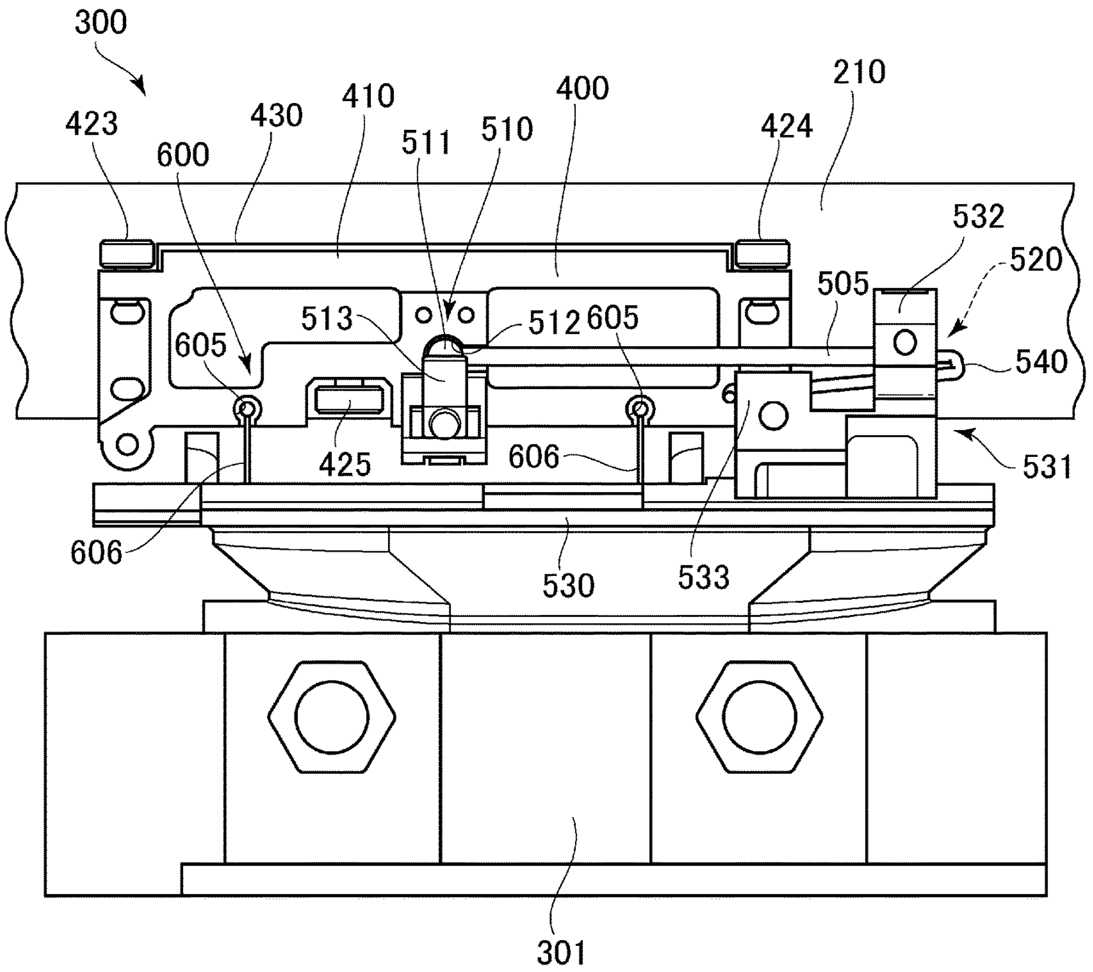
FIG. 13 is a diagram illustrating an example of a fourth exemplary embodiment.
Figure 14:
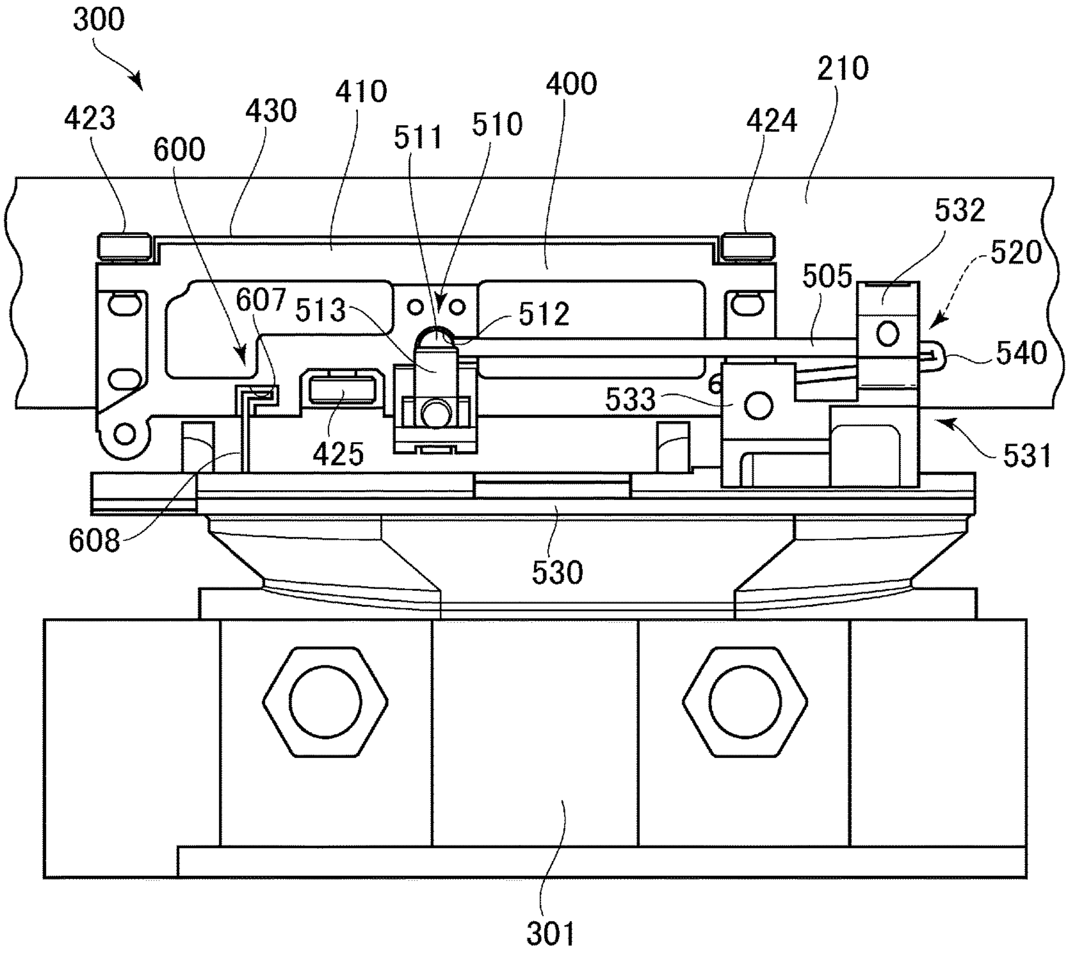
FIG. 14 is a diagram illustrating an example of a fifth exemplary embodiment.

An example of a fourth exemplary embodiment of the present invention is illustrated in FIG. 13, and an example of a fifth exemplary embodiment is illustrated in FIG. 14. In the above first to third exemplary embodiments, the misalignment detecting means 600 is constituted by fixing the projecting piece 601 and the pressing plates 603 and 604 which regulate the inclination of the connecting rod 505. However, the misalignment detecting means 600 may be constituted regardless of the connecting rod 505.

For example, in FIG. 13, a hollow hole 605 is drilled in a base frame part 410, and a pin 606 projects from a neck part 530. At the tip of the pin 606, a head part to be freely fitted in the hole 605 is provided. The diameter of the head part is smaller than the inner diameter of the hole 605 and larger than the mouth of the hole 605. The head part is to be caught by the mouth of the hole 605. The pair of the pin 606 and the hole 605 may be provided more than two. In FIG. 13, two pairs of the pin 606 and the hole 605 are provided; one is near the X-axis plus direction, and the other is near the X-axis minus direction.

Although the pin 606 and the hole 605 have such a structure, the head part of the pin 606 is caught by the mouth of the hole 605, and a traveling body 400 is detached from a main scale 210 when the inclination of the traveling body 400 to a carriage part 310 exceeds the predetermined amount.

Thus, if the main scale 210 is misaligned, the measurement is suspended due to the signal strength error.

In FIG. 14, a hollow hole 607 is drilled in the base frame part 410, and a pin 608 projects from a neck part 530 similarly to FIG. 13. Here, the hole 607 has an L shape, and the head part of the pin 608 is bent to have also an L shape. Although the hole 607 and the pin 608 have such a structure, the head part of the pin 608 is caught by the hole 607, and a traveling body 400 is detached from a main scale 210 when the inclination of the traveling body 400 to a carriage part 310 exceeds the predetermined amount. Thus, if the main scale 210 is misaligned, the measurement is suspended due to the signal strength error.

Note that, a similar effect is obtained by disposing a hole in a neck part and a pin on a traveling body.

Sixth Exemplary Embodiment

Figure 15:
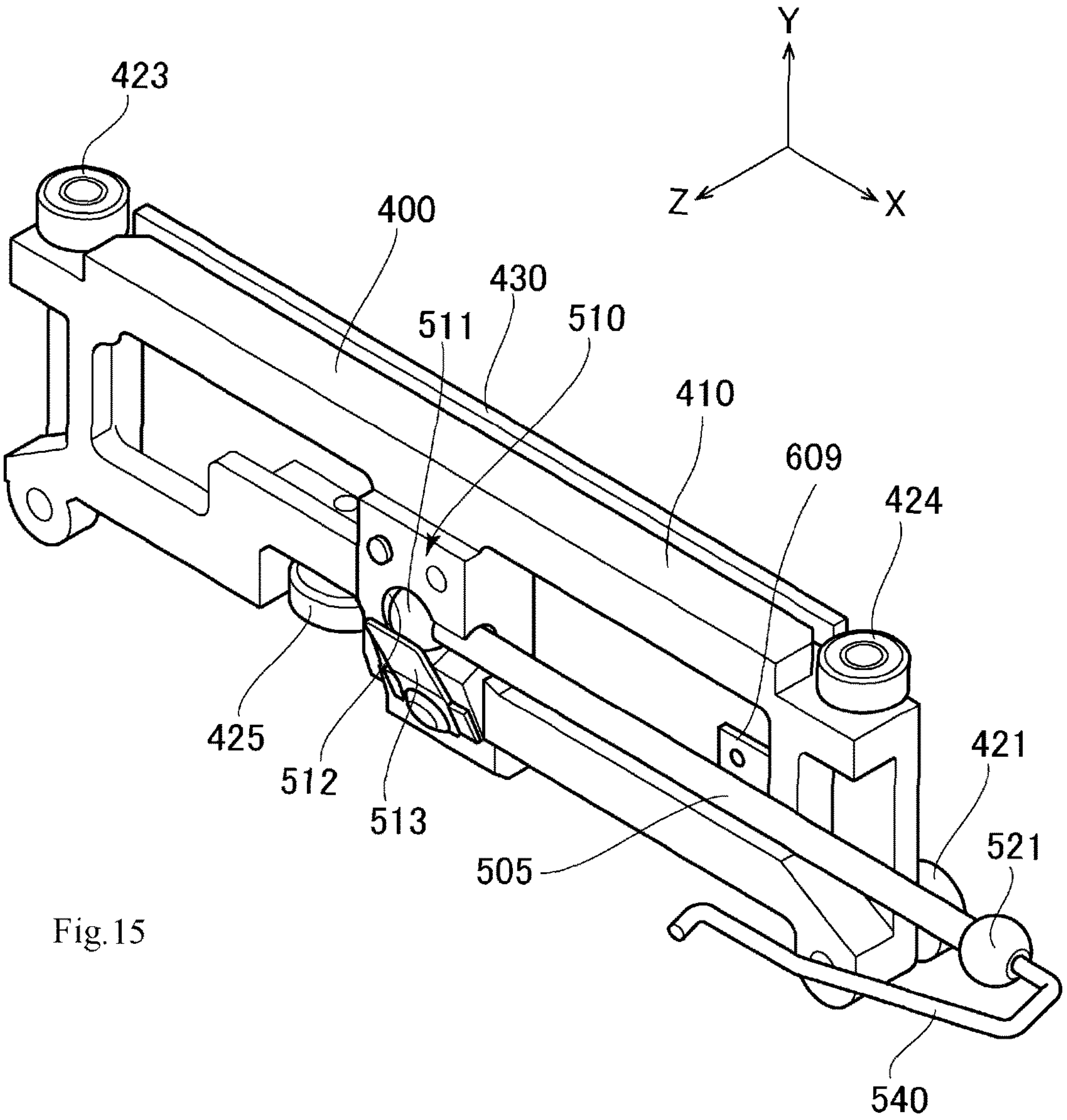
FIG. 15 is a diagram illustrating an example of a sixth exemplary embodiment.

An example of a sixth exemplary embodiment of the present invention is illustrated in FIG. 15.

In the above first to fifth exemplary embodiments, when the scale part 200 is misaligned, the misalignment is detected by the detachment of the traveling body 400 from the main scale 210.

The misalignment detecting means 600 may directly detect the relative angle (relative displacement) between the traveling body 400 and the connecting rod 505 instead of detachment of the traveling body 400 from the main scale 210.

For example, as illustrated in FIG. 15, a sensor 609 to detect the position of a connecting rod 505 may be arranged on a base frame part 410. The sensor 609 may be, for example, a magnetic or electrostatic capacitance proximity sensor 609. The sensor 609 detects that the displacement of the connecting rod 505 exceeds a predetermined amount. Then, a user is notified with display or warning sound when the sensor 609 detects the displacement. Thus, the user can notice the misalignment of the main scale 210.

Note that, the sensor 609 is not especially limited, mad may be an image sensor, such as a camera. Furthermore, the sensor 609 may be, for example, a strain gauge. For example, a strain gauge is attached to the connecting rod 505 or a wire spring 540, and outputs a detection signal when a generated strain exceeds a prescribed amount.

Note that, the present invention is not limited to the above embodiments, and can be appropriately changed without deviating from the scope.

It has been described that the projecting piece 601 as the misalignment detecting means projects from the base frame part 410, but the installation position of the projecting piece is not especially limited as long as the relative displacement of the connecting rod can be regulated. For example, a regulating piece equivalent to the projecting piece may be provided on the carriage part side. It is sufficiently possible to provide such a regulating piece on the neck part 530, more specifically, on the connection piece 532.

The invention claimed is:

1. A linear displacement measuring apparatus comprising:

an elongate main scale mounted on one of two objects which linearly relatively move; and a slider mounted on the other of the two objects and configured to slide along the main scale and detect a relative displacement amount with respect to the main scale, wherein the slider comprises;

a traveling body configured to travel on the main scale along the main scale;

a carriage part mounted on the other of the two objects;

coupling means for coupling the traveling body with the carriage part, the coupling means allowing relative displacement between the traveling body and the carriage part and biasing the traveling body toward the main scale, and misalignment detecting means for detecting that the relative displacement between the traveling body and the carriage part exceeds a prescribed allowable range.

2. The linear displacement measuring apparatus according to claim 1, wherein the coupling means has a connecting rod arranged so as to couple the traveling body with the carriage part via a ball joint, and the misalignment detecting means is a pair of projecting pieces arranged in a vicinity of the connecting rod so that displacement of the connecting rod is regulated within a predetermined range.

3. The linear displacement measuring apparatus according to claim 2, wherein the pair of projecting pieces is disposed on a frame of the traveling body so as to face with each other with a predetermined distance to receive the connecting rod therebetween.

4. The linear displacement measuring apparatus according to claim 2, wherein the misalignment detecting means is a pressing plate fixedly arranged at an opposite side to a frame of the traveling body while interposing the connecting rod.

5. The linear displacement measuring apparatus according to claim 1, wherein the misalignment detecting means comprises;

a hole provided on the traveling body and one side of the carriage part; and a pin provided on the traveling body and the other side of the carriage part, wherein a head part of the pin is freely fitted in the hole.

6. The linear displacement measuring apparatus according to claim 1, wherein the coupling means has a connecting rod arranged so as to couple the traveling body with the carriage part via a ball joint, and the misalignment detecting means is a sensor configured to detect displacement exceeding a predetermined range of the connecting rod.

7. The linear displacement measuring apparatus according to claim 1, wherein the coupling means comprises:

a connecting rod arranged so as to couple the traveling body with the carriage part via a ball joint; and an elastic member configured to bias the connecting rod toward the main scale, and the misalignment detecting means is a strain gauge fixed on the connecting rod or the elastic member.

* * * * *